United States Patent
Hanf

(10) Patent No.: US 11,029,460 B2
(45) Date of Patent: Jun. 8, 2021

(54) WAVEGUIDE AND METHOD OF IDENTIFYING A WAVEGUIDE THAT IS TOO SEVERELY CURVED

(71) Applicant: LEONI KABEL GmbH, Roth (DE)

(72) Inventor: Robert Hanf, Eisenberg (DE)

(73) Assignee: LEONI KABEL GmbH, Nuremberg (DE)

(*) Notice: Subject to any disclaimer, the term of this patent is extended or adjusted under 35 U.S.C. 154(b) by 0 days.

(21) Appl. No.: 16/489,295

(22) PCT Filed: Feb. 23, 2018

(86) PCT No.: PCT/DE2018/200013
§ 371 (c)(1),
(2) Date: Aug. 27, 2019

(87) PCT Pub. No.: WO2018/162012
PCT Pub. Date: Sep. 13, 2018

(65) Prior Publication Data
US 2020/0064530 A1    Feb. 27, 2020

(30) Foreign Application Priority Data
Mar. 6, 2017   (DE) .................. 10 2017 104 628.3

(51) Int. Cl.
*G02B 6/44* (2006.01)
*G02B 6/02* (2006.01)
(Continued)

(52) U.S. Cl.
CPC ......... *G02B 6/0003* (2013.01); *G01M 11/088* (2013.01); *G02B 6/0008* (2013.01); *G02B 6/02395* (2013.01)

(58) Field of Classification Search
CPC .................. G02B 6/0003; G02B 6/4469
See application file for complete search history.

(56) References Cited

U.S. PATENT DOCUMENTS 4,883,054 A * 11/1989 Fuller ................ G01M 11/31
                                                            606/12
5,546,223 A *  8/1996 Lewis ................ G03F 7/70375
                                                            250/227.26
(Continued)

FOREIGN PATENT DOCUMENTS

JP     H3-276133    12/1991
JP     2004-02679    1/2004

OTHER PUBLICATIONS

International Preliminary Report on Patentability dated Sep. 10, 2019 and English Translation of Written Opinion dated May 25, 2018 in PCT/DE2018/200013.
(Continued)

*Primary Examiner* — Eric Wong
(74) *Attorney, Agent, or Firm* — Grüneberg and Myers PLLC

(57) ABSTRACT

A waveguide, in particular an optical fiber, is coated and is of flexible configuration so that the waveguide can be laid in an adaptable manner, wherein the coating includes a light-frequency-converting substance so that in the event of UV light or IR light being coupled into the waveguide and an overbent waveguide, visible light escapes from the waveguide at a bend point.

18 Claims, 1 Drawing Sheet

(51) Int. Cl.
    *G01M 11/08*     (2006.01)
    *F21V 8/00*     (2006.01)

(56) References Cited

U.S. PATENT DOCUMENTS

| | | | |
|---|---|---|---|
| 5,729,335 | A | 3/1998 | Green |
| 2007/0122092 | A1* | 5/2007 | Castellani .......... G02B 6/02395 385/114 |
| 2010/0066254 | A1 | 3/2010 | Ott et al. |
| 2011/0188261 | A1* | 8/2011 | Deng ............... B29D 11/00663 362/551 |
| 2013/0272014 | A1* | 10/2013 | Logunov ................ G02B 6/001 362/554 |
| 2014/0363134 | A1* | 12/2014 | Bookbinder ......... G02B 6/4482 385/100 |
| 2015/0378089 | A1* | 12/2015 | Oba ....................... G02B 6/005 349/70 |
| 2016/0187608 | A1* | 6/2016 | Brown ................. G02B 6/4469 356/73.1 |
| 2016/0238784 | A1* | 8/2016 | Logunov ................ G02B 6/001 |
| 2016/0299293 | A1* | 10/2016 | Iida ........................ G02B 6/283 |
| 2019/0170949 | A1* | 6/2019 | Collier .................... G02B 6/02 |

OTHER PUBLICATIONS

International Search Report dated May 25, 2018 in PCT/DE2018/200013 with International English translation.
Written Opinion dated May 25, 2018 in PCT/DE2018/200013.
Office Action dated Nov. 2, 2017, in German Application No. 10 2017 104 628.3 with machine translation, 7 pages.

\* cited by examiner

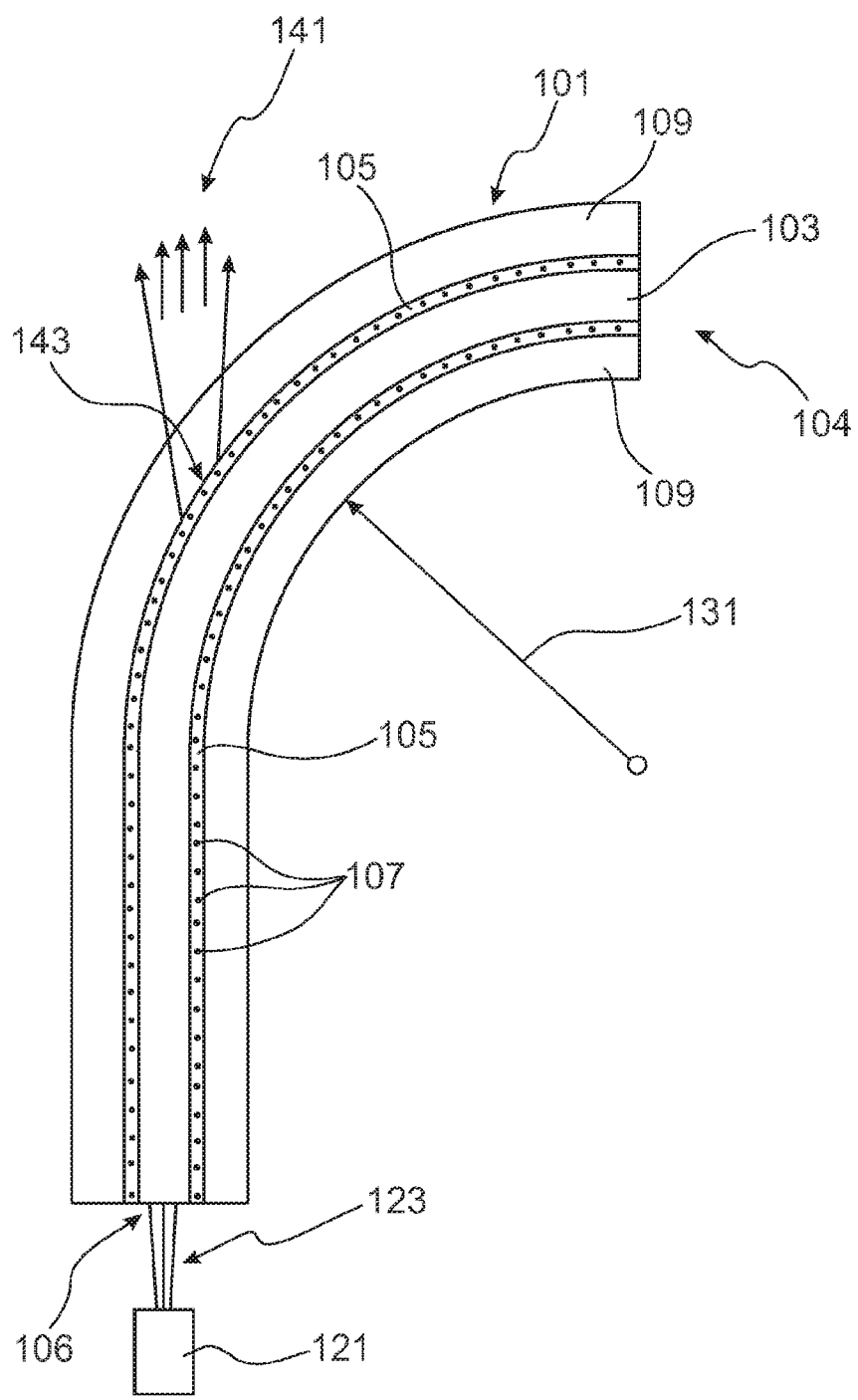

WAVEGUIDE AND METHOD OF IDENTIFYING A WAVEGUIDE THAT IS TOO SEVERELY CURVED

This application is a National Stage entry under § 371 of international Application No. PCT/DE2018/200013, filed on Feb. 23, 2018, and which claims the benefit of German Application No. 10 2017 104 628.3, filed on Mar. 6, 2017.

BACKGROUND OF THE INVENTION

Field of the Invention

The invention relates to a waveguide, in particular an optical fiber, having a coating, wherein the waveguide of flexible configuration so that the waveguide can be laid in an adaptable manner, and to a method of identifying a waveguide that is too severely curved.

Discussion of the Background

Waveguides, which are also known as optical cables, glass fibers or fiber optic elements, are often employed for the transmission of data or light. There is usually a fiber optic core, for example made of glass or plastic, which has a coating and which is additionally provided with a cladding. Light is coupled into this waveguide. Not only visible light (380 nm to 780 nm) is used here, but lower or higher wavelengths are also employed. The coupled-in light is generally guided through the waveguide by total internal reflection and coupled out again at the end.

When these types of waveguide are laid, they can become too severely curved. The result of this is that the conditions for total internal reflection no longer exist at a bend point and light is undesirably coupled out of the fiber. This can lead to an inability for a meaningful exchange of data or signals to take place via the waveguide. In particular do-it-yourself consumers, who are less experienced in handling waveguides, can thus be confronted with difficulties since they may not recognize where a waveguide is too severely curved or, correspondingly, may not be able to determine how far it can still be feasibly bent.

SUMMARY OF THE INVENTION

The object of the invention is to improve the state of the art.

The object is achieved by a waveguide, in particular an optical fiber, having a coating, wherein the waveguide is of flexible configuration so that the waveguide can be laid in an adaptable manner, wherein the coating comprises a light-frequency-converting substance, so that in the event of UV light or IR light being coupled into the waveguide and an overbent waveguide, visible light escapes from the waveguide at a bend point.

In this way, even with UV light or IR light, it is easy to determine whether excessively severe bend radii are present when the waveguide is laid, since a light that is perceptible to the human eye is generated from the light that is invisible to the human eye.

BRIEF DESCRIPTION OF DRAWING

FIGURE: a schematic diagram of a curved glass fiber, in which visible light is escaping at a bend point.

DETAILED DESCRIPTION OF THE INVENTION

The following is an explanation of terminology.

A "waveguide" refers to transparent components such as fibers, tubes or rods that transport light over short or long distances. The light transmission is achieved here by reflection at the boundary of the waveguide either by total internal reflection due to a lower refractive index of the medium surrounding the waveguides or by mirror-coating the boundary. In communications engineering in particular, so-called optical fibers are used. These optical fibers correspondingly, waveguides often consist of glass fiber and are therefore also referred to as glass fiber cables or optical cables. In addition to data transfer, they are also used in fiber-optic sensors for imaging and lighting purposes, such as for example in endoscopes, for the flexible transport of laser beams, and in lighting installations or for decoration. The fibers can also consist of plastic and polymeric optical fibers and thus comprise polymeric optical fibers. The term "waveguide" therefore includes single-mode fibers and multimode fibers.

The glass-fiber core can also comprise an additional cladding, which generally has a somewhat lower refractive index than the actual core. This allows total internal reflection to occur at an interface between the core and this cladding. This cladding can itself form the "coating" in the present case. In addition, a further coating can be provided, which is in particular configured as a protective coating. The protective coating is also called a coating or buffer in English. These coatings are often applied to the fiber in liquid form and then cured, for example using UV light, and thus permanently applied on the fiber.

A "flexible" waveguide is understood in particular to be a bendable waveguide, so that it can, for example, be applied on a roll and correspondingly unwound. Flexible thus means that its shape can be changed in respect of the longitudinal direction. Thus, bending is possible without destroying the functionality of the waveguide.

Thus, "laying" is also possible. For the laying of a waveguide, it is laid for example in a wall or in ducts and rails that have been provided, being oriented in some cases around a "corner". After a waveguide has been laid, the waveguide itself should generally not be visible.

A "light-frequency-converting substance" is a substance that modifies the wavelength of an absorbed light. Thus, for example, high-energy UV light can be converted to lower-energy (visible) light by a fluorescent dye. In the case of organic fluorescent dyes, such as for example rhodamines, part of the light energy is converted to vibrational energy of a rhodamine molecule.

A "bend point" is in particular the point in a waveguide at which, owing to a mechanical bending of the waveguide, at least part of the coupled-in light escapes. This can occur in particular as a result of the fact that, owing to the severe mechanical bending, the conditions of total internal reflection no longer exist inside the waveguide.

A core of the invention is thus based on the fact that light that is invisible to the human eye interacts with a light-frequency-converting substance when the conditions of total internal reflection no longer exist. Since in these cases the escaping light is passed through the coating, it can interact with the light-frequency-converting substance there, as a result of which light that is visible to the human eye then escapes.

In one embodiment, the light-frequency-converting substance has a concentration of less than 5.0 wt. % or less than 2.0 wt. % or less than 1.2 wt. % or less than 0.8 wt. % or less than 0.4 wt. % or less than 0.2 wt. % and more than 0.1 wt. %, based on a total mass of the coating. In general terms, the higher the light output of a light-frequency-converting substance, the lower its concentration can be. Thus, for example, excellent results have been achieved with rhodamine 6G at a concentration of 0.4 wt. %.

It should be noted at this point that the light-frequency-converting substance can be added to the coating either as particles that are insoluble an the coating or as a soluble substance. It has proved particularly simple for the light-frequency-converting substance to be mixed homogeneously in a liquid phase of the coating and then for the mixture to be sprayed on to the core of the waveguide and then cured.

To obtain the simplest possible implementation, the light-frequency-converting substance can be designed such that the light-frequency-converting substance generates a low-frequency light from a higher-frequency light. This is ensured with fluorescent dyes in particular. These substances can be employed in particular when UV light, for example in a range of between 200 nm and 380 nm, is guided in the waveguide. In this case, fluorescent dyes in particular are thus employed as the light-frequency-converting substance.

In particular in a related embodiment, the light-frequency-converting substance is a coumarin dye, a cyanine dye, a flavine dye, a luciferin dye, a phycobilin dye, a rhodamine dye and/or a safranin dye.

In particular in order for low-energy light that cannot be seen by the eye, such as e.g. infrared light at a wavelength of between 780 nm and 1560 nm, to be made visible to the eye, the light-frequency-converting substance can be selected such that the light-frequency-converting substance generates a higher frequency light from a low-frequency light. This is based in particular on the effect that two photons, each with for example 1000 nm, generate a new photon with double the frequency (corresponding to half the wavelength). This effect is also known in English as "up-conversion". For example, urea can be used as a light-frequency-converting substance for this purpose.

To protect the core of the coated waveguide, the waveguide can have a cladding. This is often a plastic such as e.g. polyimides, acrylic or silicone. In a related embodiment, the cladding is transparent. This can be achieved by a transparent silicone, for example.

This is therefore advantageous particularly since it enables light that escapes when the waveguide is mechanically overbent to be more readily perceived by a person since the visible light is better able to pass outwards through the cladding.

The object is further achieved by a method of identifying a waveguide that is too severely curved, wherein a waveguide as described above is employed, having the following steps:

laying the waveguide,
coupling in a UV light or an IR light and
visually inspecting the waveguide for escaping visible light, so that if an escape of visible light is identified, the waveguide is too severely curved.

Thus, even inexperienced persons can lay waveguides reliably, ensuring optimal working with the waveguide.

The invention will be explained in more detail below with reference to exemplary embodiments. The single FIGURE shows the following:

FIG. 1: a schematic diagram of a curved glass fiber, in which visible light is escaping at a bend point A glass fiber 101 has a fiber core 103, a coating 105 and a transparent fiber cladding 109 composed of silicone. The fiber core 103 is composed of glass. In a first alternative, the coating 105 comprises 0.4 wt. % rhodamine 6G. Prior to the production process, to this end, the rhodamine 6G was accordingly added in a liquid state to the subsequent coating agent and mixed therewith. The concentration value relates to the coating in the liquid state. The coating agent with the dissolved rhodamine 6G was sprayed on to the fiber core 103 and cured using UV light. Covering with the fiber cladding 109 then took place. Thus, rhodamine 6G particles 107 are arranged in the coating 105.

In the present case the glass fiber 101 is curved according to a bend radius 131. In addition, a light source 121, which is an LED and which transmits UV light 123, is arranged at a fiber input 106. The UV light 123 emitted by the light source 121 is coupled into the fiber core 103 and is guided on the basis of total internal reflection at the interface between fiber core 103 and coating 105 by means of total internal reflection towards the fiber output 104.

Since the bend is too severe at a bend point 143 of the glass fiber 101, total internal reflection no longer exists. Thus, the irradiated UV light 123 interacts reciprocally with the rhodamine 6G particles 107 at the bend point 143 in the coating 105, so that visible emergent light 141 is emitted.

In an alternative, urea is used instead of rhodamine 6G. The concentration of the urea is 2.4 wt. %. Furthermore, in this case infrared light 123 with a wavelength of 1050 nm is coupled into the glass fiber 101 as the light source 121.

Now, visible light with a wavelength of 525 nm likewise escapes at the bend point 143, wherein the "up-conversion" of the photons is achieved by urea particles 107.

The invention claimed is:

1. A waveguide, comprising:
   a core,
   a cladding, and
   a coating, wherein the coating is immediately adjacent to the core,
   wherein the waveguide is of flexible configuration so that the waveguide can be laid in an adaptable manner,
   wherein the coating comprises a light-frequency-converting substance and the light-frequency-converting substance converts UV or IR light into visible light, so that in the event of UV light or IR light being coupled into the waveguide and an overbent waveguide at a bend point, visible light escapes from the waveguide at the bend point, and
   wherein the coating is disposed between the core and the cladding.

2. The waveguide according to claim 1, wherein the light-frequency-converting substance has a concentration of less than 5.0 wt. % and more than 0.1 wt. %, based on a total mass of the coating.

3. The waveguide according to claim 1 wherein the light-frequency-converting substance is selected such that the light-frequency-converting substance generates a low-frequency light from a higher-frequency light.

4. The waveguide according to claim 1 wherein the light-frequency-converting substance is selected from the group consisting of a coumarin dye, a cyanine dye, a flavine dye, a luciferin dye, a phycobilin dye, a rhodamine dye, a safranin dye and a combination of two or more of the aforementioned dyes.

5. The waveguide according to claim 1 wherein the light-frequency-converting substance is selected such that the light-frequency-converting substance generates a higher-frequency light from a low-frequency light.

6. The waveguide according to claim 5, wherein the light-frequency-converting substance is urea.

7. The waveguide according to claim 1, wherein the cladding is transparent.

8. A method of identifying a waveguide that is too severely curved, wherein the waveguide comprises a core, a cladding, and a coating, wherein the coating is immediately adjacent to the core, and wherein the coating comprises a light-frequency-converting substance and the light-frequency converting substance converts UV or IR light into visible light, the method comprising:
- laying the waveguide,
- coupling in a UV light and/or an IR light, and
- visually inspecting the waveguide for escaping visible light so that if an escape of visible light is identified at a bend point, the waveguide is too severely curved,
- wherein the coating is disposed between the core and the cladding.

9. The waveguide according to claim 1, wherein the waveguide is an optical fiber.

10. The method according to claim 8, wherein the waveguide is an optical fiber.

11. The waveguide according to claim 3, wherein the light-frequency-converting substance is a fluorescent dye.

12. The waveguide according to claim 3, wherein the light-frequency-converting substance is at least one selected from the group consisting of a coumarin dye, a cyanine dye, a flavine dye, a luciferin dye, a phycobilin dye, a rhodamine dye, and a safranin dye.

13. The waveguide according to claim 1, wherein the cladding comprises at least one material selected from the group consisting of a polyimide, an acrylic, and a silicone.

14. The method according to claim 8, wherein the light-frequency-converting substance has a concentration of less than 5.0 wt. % and more than 0.1 wt. %, based on a total mass of the coating.

15. The method according to claim 8, wherein the light-frequency-converting substance is selected such that the light-frequency-converting substance generates a low-frequency light from a higher-frequency light or a higher-frequency light from a low-frequency light.

16. The method according to claim 15, wherein the light-frequency-converting substance generates a low-frequency light from a higher-frequency light, and wherein the light-frequency-converting substance is at least one selected from the group consisting of a coumarin dye, a cyanine dye, a flavine dye, a luciferin dye, a phycobilin dye, a rhodamine dye, and a safranin dye.

17. The method according to claim 15, wherein the light-frequency-converting substance generates a higher-frequency light from a low-frequency light, and wherein the light-frequency-converting substance is urea.

18. The method according to claim 8, wherein the cladding is transparent.

* * * * *